(12) United States Patent
Copenhaver

(10) Patent No.: US 9,676,486 B2
(45) Date of Patent: *Jun. 13, 2017

(54) PARACHUTE HARNESS CONTAINER WITH BIO-CONTOURED LOAD DISTRIBUTING VEST

(71) Applicant: Airborne Systems North America of NJ Inc., Pennsauken, NJ (US)

(72) Inventor: Randolph Lee Copenhaver, Shamong, NJ (US)

(73) Assignee: AIRBORNE SYSTEMS NORTH AMERICA OF NJ, INC., Pennsauken, NJ (US)

( * ) Notice: Subject to any disclaimer, the term of this patent is extended or adjusted under 35 U.S.C. 154(b) by 36 days.

This patent is subject to a terminal disclaimer.

(21) Appl. No.: 14/517,329

(22) Filed: Oct. 17, 2014

(65) Prior Publication Data

US 2015/0136912 A1    May 21, 2015

Related U.S. Application Data

(63) Continuation of application No. 13/632,304, filed on Oct. 1, 2012, now Pat. No. 8,899,526.

(60) Provisional application No. 61/541,555, filed on Sep. 30, 2011.

(51) Int. Cl.
*B64D 17/30* (2006.01)
*B64D 17/40* (2006.01)

(52) U.S. Cl.
CPC ............ *B64D 17/30* (2013.01); *B64D 17/40* (2013.01); *Y10T 29/49716* (2015.01); *Y10T 29/49826* (2015.01)

(58) Field of Classification Search
CPC ............ B64D 17/30; B64D 17/40; A45F 3/04
See application file for complete search history.

(56) References Cited

U.S. PATENT DOCUMENTS

| 2,318,673 | A | 5/1943 | Coleman |
|---|---|---|---|
| 2,342,420 | A | 2/1944 | Miner |
| 2,382,816 | A | 8/1945 | Quilter et al. |
| 2,430,773 | A | 11/1947 | Kowalski |
| 2,464,719 | A | 3/1949 | Quilter et al. |
| 2,527,972 | A | 10/1950 | Tauty |
| 2,643,836 | A | 6/1953 | Carroll |
| 3,262,660 | A | 7/1966 | Morrell et al. |
| 3,357,613 | A | 12/1967 | Chase |

(Continued)

FOREIGN PATENT DOCUMENTS

AU    2009100889    10/2009

*Primary Examiner* — Joseph W Sanderson
(74) *Attorney, Agent, or Firm* — Jacobson Holman, PLLC.

(57) ABSTRACT

A harness container for a parachutist has a bio-contoured support cradle or load distributing vest. The load distributing vest, which is generally U-shaped and includes an upper yoke and two straps integral with the yoke, has a multi-layer construction that includes an outer layer and an inner layer mounted on a bio-contoured pad. The outer layer and the inner layer are of corresponding shape and are sewn to one another along a reinforced edging with the pad therebetween. The upper yoke is attached to the front side of the harness container and the ends of the vest straps are attached to the main lift webs so that the vest elevates the harness container and distributes the load thereof across the jumper's shoulders, back and chest for increased comfort.

15 Claims, 5 Drawing Sheets

(56) References Cited

U.S. PATENT DOCUMENTS

| | | | |
|---|---|---|---|
| 3,767,143 A | 10/1973 | Gaylord | |
| 4,938,436 A | 7/1990 | Bradley et al. | |
| 5,033,697 A | 7/1991 | Munson et al. | |
| 5,114,059 A * | 5/1992 | Thatcher | A45F 3/04 224/148.5 |
| 5,551,081 A | 9/1996 | Starnes et al. | |
| 6,824,106 B2 | 11/2004 | Douglas et al. | |
| 8,899,526 B2 * | 12/2014 | Copenhaver | B64D 17/30 224/637 |
| 8,998,145 B2 * | 4/2015 | Higgins | B64D 17/30 244/148 |
| 2003/0146348 A1 | 8/2003 | Douglas et al. | |
| 2011/0168846 A1 | 7/2011 | Strong | |

* cited by examiner

PARACHUTE HARNESS CONTAINER WITH BIO-CONTOURED LOAD DISTRIBUTING VEST

This application is a continuation of co-pending U.S. application Ser. No. 13/632,304 filed Oct. 1, 2012, which claimed priority from U.S. Provisional application, Ser. No. 61/541,555, filed Sep. 30, 2011, and hereby claims the priority thereof to which it is entitled.

BACKGROUND OF THE INVENTION

Field of the Invention

The present invention is related to the field of manned parachutes and, more particularly, to a parachute harness container with a bio-contoured load distributing support cradle or vest.

Description of the Related Art

A parachutist wearing a conventional parachute harness container bears all of the weight of the harness container upon a small load bearing area on the tops of his or her shoulders where the harness straps pass over the clavicle area. Given the weight of the harness container and the length of time that the parachutist must often wear the harness and harness container in readiness for and prior to a jump, these two narrow load-bearing points create considerable pressure leading to discomfort and fatigue.

In addition, a parachutist wearing a conventional parachute container may have limited head movement due to interference between the parachutist's helmet and the top flap of the reserve container. This interference can limit the parachutist's situational awareness as the parachutist may not be able to turn his or her head sufficiently to see all of the surrounding area.

Therefore, a need exists for an improved harness container that better distributes the load of the harness container on the upper torso to increase the parachutist's comfort and increase the ease and range of motion of the jumper's head. The terms "parachutist" and "jumper" are used interchangeably throughout this description.

SUMMARY OF THE INVENTION

In view of the foregoing, the present invention is directed to a bio-contoured load distributing vest or support cradle for a harness container and to a harness container having such a bio-contoured load distributing vest or support cradle. The load distributing vest is generally U-shaped and includes an upper yoke and two straps integral with the yoke. The vest includes inner and outer layers mounted on a bio-contoured pad that is sandwiched in the middle between the outer and inner layers. The bio-contoured pad distributes the weight of the harness container over a wider area across the jumper's shoulders and upper back to eliminate pressure points commonly seen with conventional parachute harness containers and thereby increase the jumper's comfort.

Accordingly, it is an object of the present invention to provide a parachute harness container having a bio-contoured load distributing vest that distributes the weight of the harness container over a wider area across the jumper's shoulders and upper back to eliminate pressure points commonly encountered with conventional parachute harness containers and thereby to increase the jumper's comfort.

Another object of the present invention is to provide a parachute harness container with a bio-contoured load distributing vest for a parachutist that increases safety and comfort while maintaining a standard harness architecture to minimize transitional training.

A further object of the present invention is to provide a bio-contoured load distributing vest for a parachute harness container in accordance with the preceding objects that aligns and raises the harness container along the vertical axis of the parachutist's body and reduces the pressure on the lower back.

Still another object of the present invention is to provide a bio-contoured load distributing vest for a parachute harness container in accordance with the preceding objects that stabilizes the harness container during body movement, both on the ground and in freefall.

A further object of the present invention is to provide a bio-contoured load distributing vest for a parachute harness container in accordance with the preceding objects in which the design of the bio-contoured vest yoke prevents interference between the parachutist's helmet and the top flap of the reserve container, providing the parachutist with the maximum range of head movement and thereby increasing the parachutist's situational awareness.

A still further object of the present invention is to provide a bio-contoured load distributing vest for a parachute harness container in accordance with the preceding objects that can be either integrated with the harness container during manufacture or retrofitted into existing or legacy harness containers.

Yet another object of the present invention is to provide a harness container with a bio-contoured load distributing vest in accordance with the preceding objects that is not complex in structure and which can be manufactured at low cost but yet offers excellent comfort and ergonomic fit while providing safe and reliable performance.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

In describing a preferred embodiment of the invention illustrated in the accompanying photographs and drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 1:
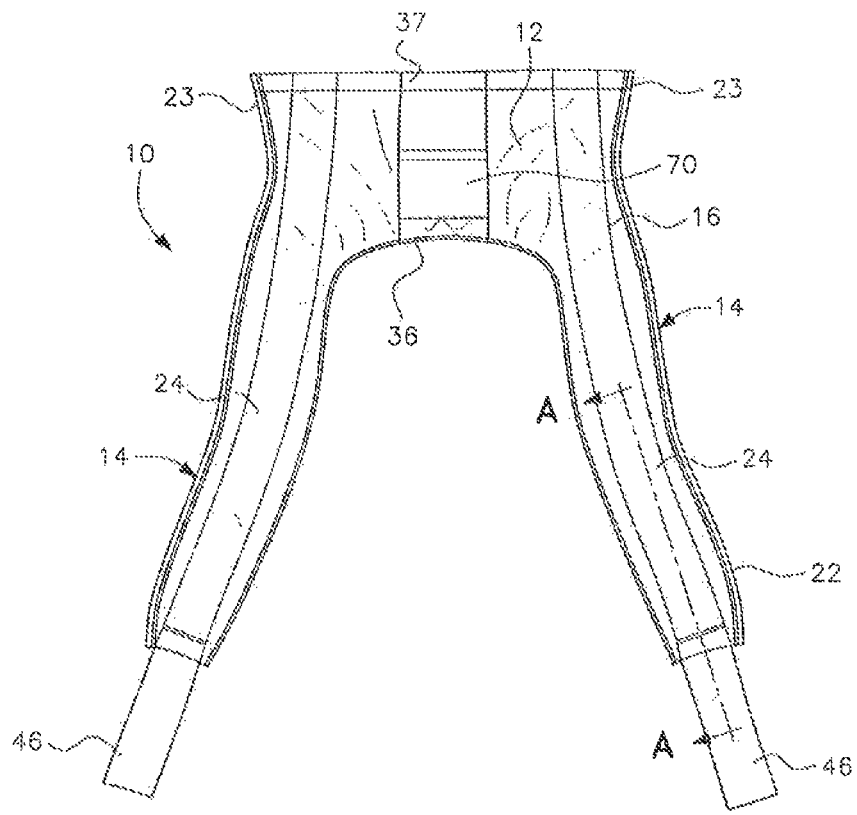
FIG. 1 is a photograph of a load distributing vest or support cradle in accordance with the present invention.

As shown in FIG. 1, the present invention is directed to a support cradle or load distributing vest generally designated by reference numeral 10. The load distributing vest 10 is generally U-shaped and includes a generally rectangular upper yoke 12 and two elongated straps 14 extending from and, preferably integral with, the upper yoke 12.

Figure 2:
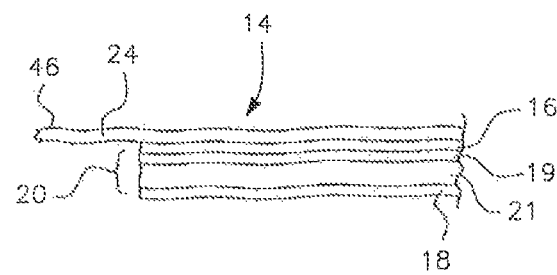
FIG. 2 is a drawing of a cross section of the load distributing vest taken along line A-A of FIG. 1.
Figure 3:
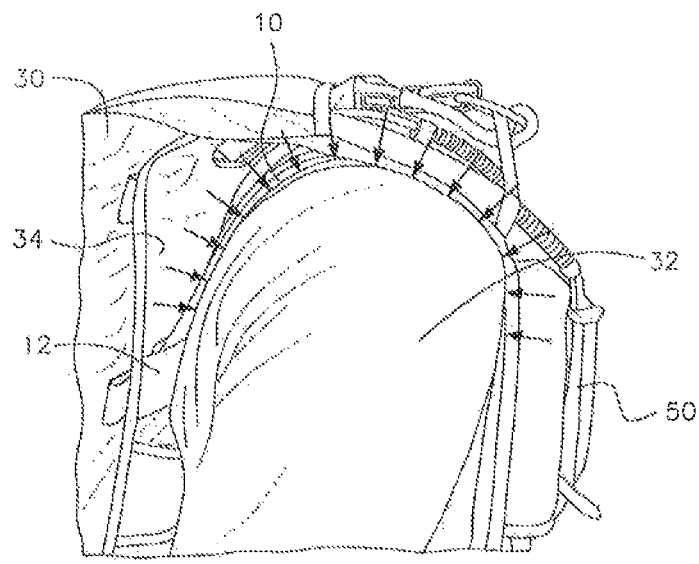
FIG. 3 is a photograph showing a side view of the load distributing vest shown in FIG. 1 as integrated with a harness container and positioned on a jumper.

As shown in the cross-sectional view of FIG. 2, the load distributing vest 10 has a multi-layer construction that includes an outer layer 16 and an inner layer 18 mounted on a bio-contoured pad 20 that is sandwiched in the middle between the outer and inner layers 16, 18. The outer layer 16 and the inner layer 18 are of corresponding shape and are sewn to one another along a reinforced edging 22 to contain the pad therebetween. The outer and inner layers 16, 18 are made of a durable, non-stretch fabric material such as the material used to make the harness container 30 (see FIG. 3). According to the illustrated embodiment, the outer layer of fabric is nylon duck per specification MIL-C-43734, commonly referred to as CORDURA® brand fabric. The inner layer of fabric is nylon duck per specification PIA-C-7219, commonly referred to as para-pack. Other suitable fabric materials for use on a parachutist harness container where strength must be maximized and weight minimized could also be used as would be known to persons of ordinary skill in the art.

The load distributing vest 10 further includes two lengths of load bearing shoulder webbing 24, each of which extends along the entire length of the straps 14, respectively, and across the width of the upper yoke 12 along the outer sides 23 thereof, as shown in FIG. 1. As shown, the lower ends 46 of the webbing 24 extend beyond the padded straps 14. The webbing 24 is secured to the outer layer 16, preferably by stitching as would be known by persons of skill in the art. Sewing only the outer layer of webbing is preferable to avoid compression of the underlying foam layers which would diminish user comfort. As used herein, the term "load distributing vest straps" refers to the combination of the outer and inner layers 16, 18, the pad 20 and the full length of the load-bearing webbing 24 as shown in FIGS. 1 and 2 and identified by reference numeral 14.

The bio-contoured pad 20 is preferably constructed of several layers of multi-density foam. Multi-density foam is a preferred material as it is light in weight and provides excellent cushioning and load distribution. According to one embodiment, the pad has two layers including an outer layer 19 and an inner layer 21. The outer layer 19 can be made of high-density VOLARA® brand 6A foam and is preferably about ⅛th inch in thickness. This outer layer is positioned between the load bearing shoulder webbing 24 and the inner, comfort layer 21 of foam to spread the load from the straps into the comfort layer. The inner, comfort layer 21 has a density less than that of the outer layer and may preferably be made of SBE41VN foam rubber about ¼ inch in thickness. With the thickness levels specified, the combined thickness of the pad is about ⅜th of an inch. Other compressible, pressure-absorbing/distributing materials could also be used to provide a pad with suitable cushioning levels to the load distributing vest 10. Depending upon the specific materials used for the inner and outer layers, the thickness of each layer may be greater or lesser as determined by the properties of the materials used in order to obtain the desired load distribution effect in accordance with the present invention.

Figure 4:
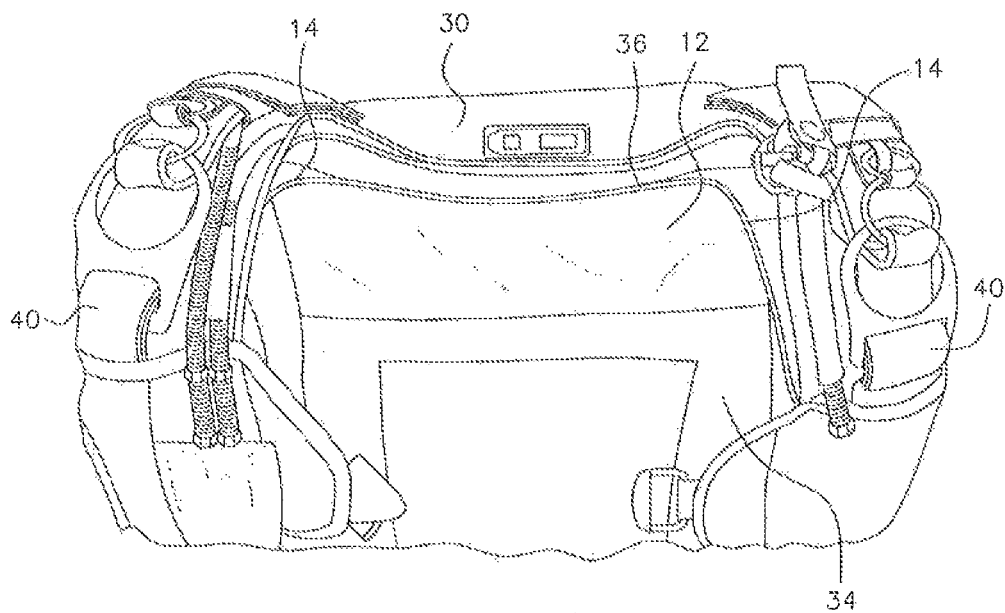
FIG. 4 is a photograph of the front side of the harness container which is in contact with the jumper's back when the harness container is worn, with the load distributing vest shown in FIG. 1 sewn onto the container's front side according to the present invention.
Figure 5:
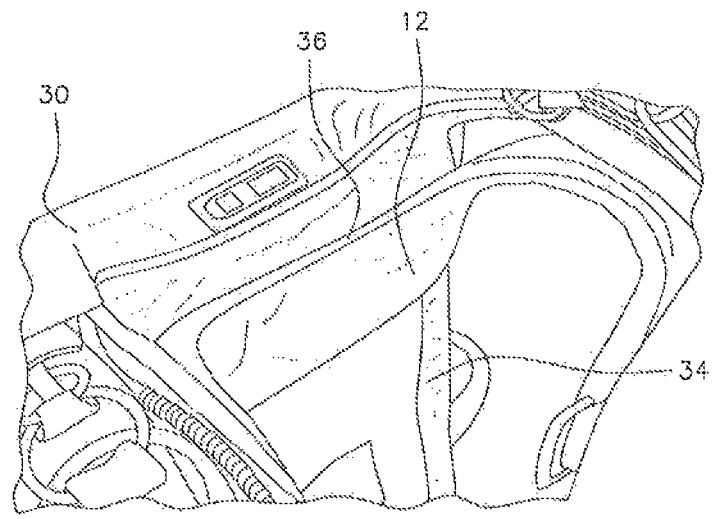
FIG. 5 is a photograph of the harness container and load distributing vest shown in FIG. 4, rotated about 45 degrees to show the relationship between one of the load distributing vest straps and the main lift web of the parachute harness container.

As shown in FIGS. 3-6, the load distributing vest 10 is used in combination with a parachute harness container 30 and distributes the weight of the parachute container 30 over a much broader area of the parachutist's body 32 (see FIGS. 3, 10 and 11) than does a conventional harness container. The upper yoke 12 is secured to the upper front side 34 of the parachute harness container 30 so that the load distributing vest straps 14 extend from the neck-facing edge 36 of the yoke 12, as shown in FIGS. 4 and 5. The load distributing vest straps 14 are then aligned with the main lift webs 40 on each side of the parachute harness container 30 so as to run substantially parallel with and under the main lift webs 40.

Figure 6:
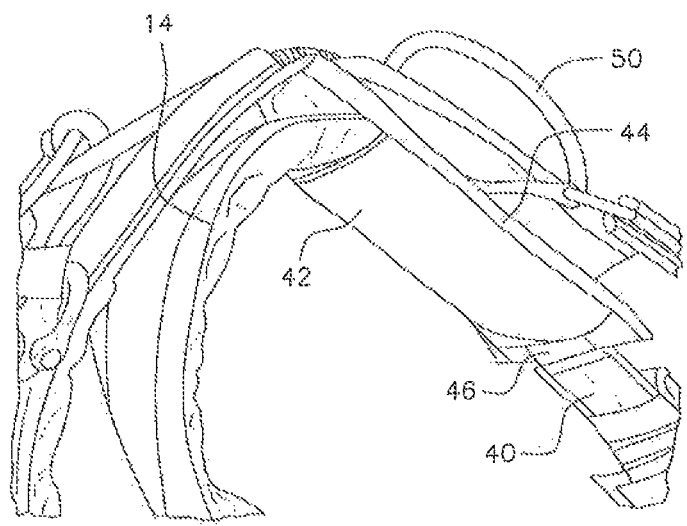
FIG. 6 is a photograph showing the jumper-contacting underside of a load distributing vest strap as received within a guide panel sewn onto the inner surface of the main lift web of the parachute harness container.

To ensure that the load distributing vest straps 14 remain in proper alignment with the main lift webs 40, a guide panel 42 is sewn onto the inner surface of each of the main lift webs 40. The guide panel 42 is sewn along its longitudinal edges 44 to form a channel with webs 40 through which the load bearing webbing 24 of the load distributing vest straps 14 is threaded as shown in FIG. 6. The free ends 46 of the load bearing webbing 24 are then sewn or otherwise secured to the inside of the main lift webs 40 as shown in FIG. 6. The guide panels 42 are preferably positioned adjacent the rip cord handle mechanism 50 which is secured to the outer surface of the main lift web as is known in the art.

Figure 7:
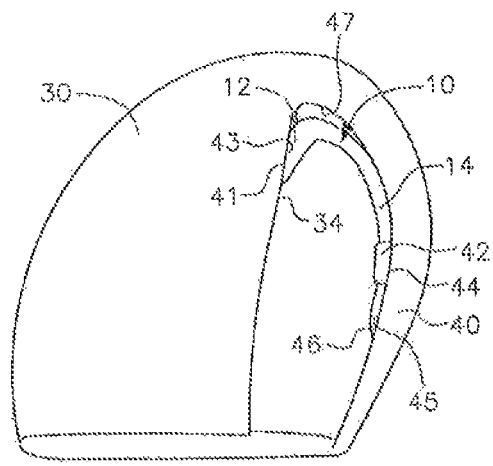
FIG. 7 is a drawing depicting a side view of the load distributing vest shown in FIG. 1, showing a first connection point with the harness container along the yoke of the load distributing vest and a second connection point with the main lift web at the end of one of the load distributing vest straps.

The length of the load distributing vest 10 from the point of its attachment 41 at the upper yoke 12 to the free ends 46 of the load distributing vest straps 14 is less than the distance between the yoke-attachment point on the container 43 and the point 45 on the main lift web 40 where the strap free ends 46 are attached, as measured from the front side 34 of the harness container and along the inner side 47 of the harness container straps (see FIG. 7). As a result, when the harness container 30 with the load distributing vest 10 is worn, the load distributing vest 10 fits against the parachutist's shoulders and chest while the harness container straps above the vest straps are somewhat "loose". In addition, because the load distributing vest includes the bio-contoured pad which is layered within both the yoke and the straps, the padding that would normally be included on the straps of a conventional harness container is not necessary when the load distributing vest 10 is incorporated within a harness container according to the present invention.

With respect to the above stated relationship between the length of the load distributing vest from the point of its attachment at the upper yoke to the free ends of the load distributing vest straps as being less than the distance between the yoke-attachment point on the container and the point on the main lift web where the strap free ends are attached, it is possible to install a vest without this relationship. Such a vest may provide comfort beyond that of a standard harness, but the load distribution provided by the present invention cannot be achieved.

The load distributing support cradle or vest is sized for use with a conventional harness container. Therefore, the length of the straps is appropriate to enable the straps to run concurrently with the harness container straps and be layered therewith on the side contacting the jumper as described above. According to the illustrated embodiment, the load distributing vest is about 22 inches in length from the outer edge 37 of the upper yoke 12 to the strap ends 46. The substantially rectangular yoke is preferably about 12 inches wide as measured between the outer sides 23, and has a length of about 5.5 inches from the outer edge 37 to the neck-facing edge 36. The width of the straps 14 is preferably between about 2.0 and about 3.0 inches, more preferably about 2.5 inches. The length of the padded portion of the straps 14 is between about 12 inches and about 16 inches in length, more preferably about 14 inches in length, while the load bearing webbing 24 that extends from the padded portion of the straps 14 is generally about 2-4 inches in length. The thickness of the pad, including the outer layer 19 and the inner layer 21, is preferably between about ⅜th inches and about one half inch. While these dimensions are provided, it is to be understood that the dimensions of the vest components as defined could vary without departing from the scope of the invention.

Figures 8, 9:
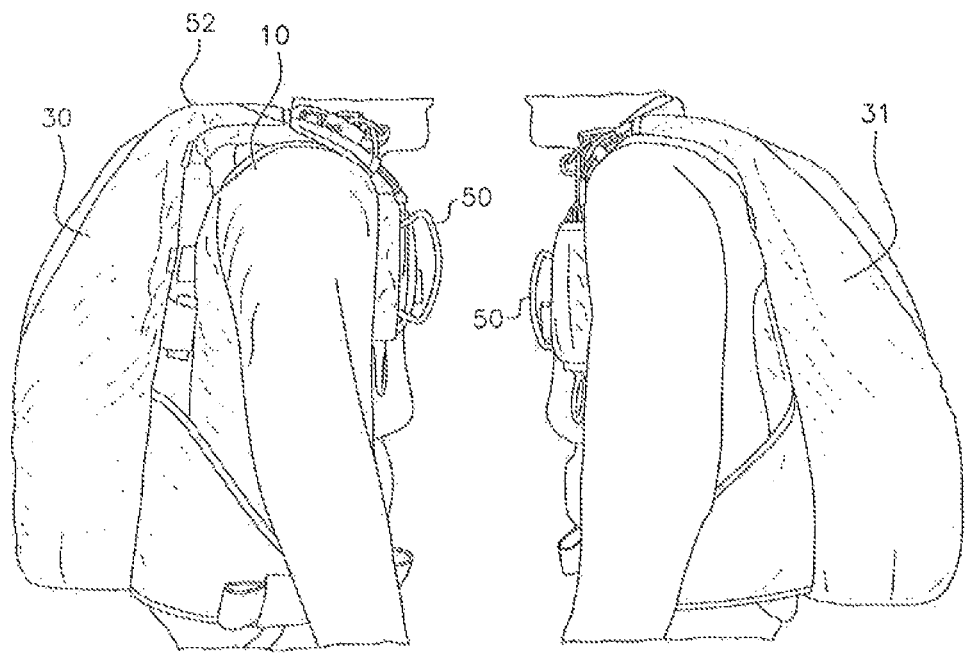
FIG. 8 is a right-side photograph of a jumper wearing a harness container equipped with a load distributing vest according to the present invention, showing how the load distributing vest fits against the parachutist's shoulders and elevates the harness container.
FIG. 9 is a left-side photograph of a jumper wearing an existing or legacy harness container, showing the difference in the position of the harness container as compared with that obtained with the vest of the present invention as shown in FIG. 8.

The fit of the support cradle or vest 10 in relationship with the dimensions of the harness container 30 elevates the harness container 30 above the vest straps 14 as shown in FIG. 8. The elevated position of the harness container 30 as shown in FIG. 8 is made more evident when contrasted with the fit of an existing or legacy harness container 31 as shown in FIG. 9. The comparison provided by FIGS. 8 and 9 also confirms that the elevated position does not meaningfully change the optimal placement position of ripcord 50.

In elevating the harness container, the load distributing vest 10 also spaces the top flap 52 of the harness container 30 away from the parachutist's head. This spacing, combined with the shape of the reserve free bag, provides the jumper with maximum head movement and prevents interaction of the parachutist's helmet with the top flap of the container. By adding range of motion to the parachutist's head, the jumper has increased situational awareness, increasing jumper safety.

Figure 10:
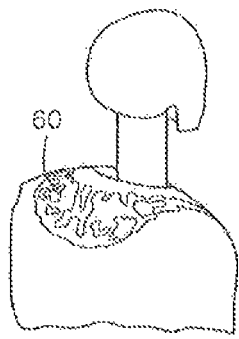
FIG. 10 is a computer simulation drawing showing the broadened load and pressure distribution area on a jumper's shoulders which is created by the load distributing vest according to the present invention.
Figure 11:
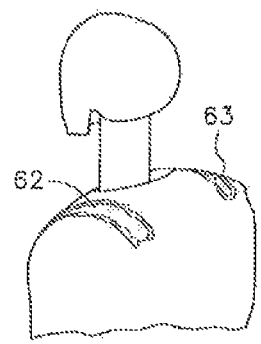
FIG. 11 is a computer simulation drawing showing the narrow load bearing area experienced by a jumper when wearing a legacy harness container.

The improved pressure distribution in the shoulder and yoke area which is provided by the load distributing vest 10 of the present invention is shown in the computer simulated images of FIGS. 10 and 11. FIG. 10 illustrates the pressure distribution area 60 on the jumper when the harness container 30 (not shown in FIG. 10) is equipped with the load distributing vest 10 according to the present invention. FIG. 11 illustrates the pressure distribution of a legacy harness container 31 (not shown in FIG. 11), with the load being borne across two narrow areas 62 on the upper part of the jumper's shoulders. As evident from these two images, the load distributing vest 10 greatly increases the load bearing area 60, distributing the weight of the harness container 30 across the jumper's shoulders. In addition to distributing the load, the load distributing vest 10 also realigns and raises the harness container 30 along the vertical axis of the body, reducing pressure on the lower back.

Figure 12:
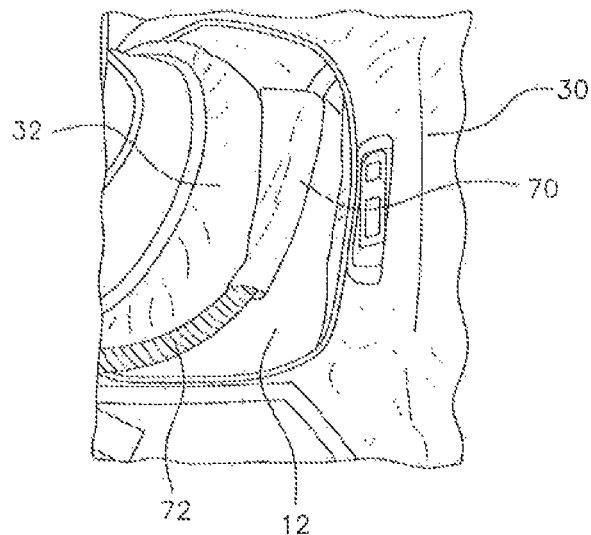
FIG. 12 is a photograph showing the yoke of the load distributing vest in accordance with the present invention and provided with an oxygen hose housing for managing the position of an oxygen hose during high altitude jumps.

The load distributing vest 10 may further include an oxygen hose housing 70 (see FIGS. 1 and 12) for managing the position of an oxygen hose 72 when needed for high altitude jumps. As shown in FIG. 12, the oxygen hose housing 70 is attached to the yoke 12 of the vest 10 and provides a channel through the hose 72 can pass to maintain the hose in a desired placement position.

An additional benefit of the load distributing vest 10 is that the vest stabilizes the harness container 30 during body movement, both on the ground and in freefall. In particular, when using the vest 10, the jumper's body movements do not directly translate into a corresponding shift in the position of the harness container. Rather, the parachutist's body movements are absorbed across the load distributing vest, lessening the impact of such movements on the position of the harness container and the resulting fatigue of the parachutist in trying to reposition the harness.

The load distributing vest 10 as described herein may be retrofitted to fit any legacy harness container by sewing the upper yoke 12 to the front side 34 of the container 30, running the vest straps 14 concurrently with the main lift webs 40 and then securing the ends 46 of the vest straps 14 to the inner surface of the main lift webs 40, respectively. Preferably, the harness container 30 is manufactured to include the load distributing vest 10 as an integral component.

The foregoing descriptions and drawings should be considered as illustrative only of the principles of the invention. The invention may be configured in a variety of shapes and sizes and is not limited by the dimensions of the preferred embodiment. Therefore, it is not desired to limit the invention to the specific examples disclosed or the exact construction and operation shown and described. Rather, all suitable modifications and equivalents may be resorted to, falling within the scope of the invention.

What is claimed is:

1. A load distributing vest and parachute harness container combination comprising:
   a parachute harness container that is in contact with a jumper's back when the harness container is worn, said container configured to secure therein at least a main parachute, said container including harness container straps that are worn across the jumper's shoulders to secure the container in position on the jumper's back, and lift webs connected to parachute risers to support the jumper during descent; and
   load distributing vest including an upper yoke and a pair of vest straps extending outwardly from the yoke to respective vest strap ends, said vest being attached to the harness container at a vest attachment point and said vest straps extending generally parallel with said harness container straps and being in contact with the jumper's shoulders, back and chest, each of said vest straps being attached to said lift webs at a respective vest strap attachment point, a length of said load distributing vest from said yoke to said vest strap attachment points being less than a distance between said vest attachment point on the harness container and said vest strap attachment points on said lift webs as measured from the harness container along said harness container straps so that load from said harness container is distributed across the jumper's back, shoulders and chest by the load distributing vest.

2. The load distributing vest and harness container combination as set forth in claim 1, wherein said vest, straps each include a length of load-bearing shoulder webbing, said load-bearing shoulder webbing being that part of the vest straps that is attached to said lift webs at the vest strap attachment points.

3. The load distributing vest and harness container combination as set forth in claim 2, wherein said vest includes an outer layer and an inner layer mounted on a bio-contoured pad, the inner and outer layers being made of a nylon fabric, said two lengths of load-bearing shoulder webbing running a length of each vest strap, respectively, and across said upper yoke, said lengths of load-bearing shoulder webbing being secured to said outer layer.

4. The load distributing vest and harness container combination as set forth in claim 3, wherein said bio-contoured pad includes an outer layer made of foam and an inner layer made of foam, said pad inner layer foam having a density less than a density of said pad outer layer foam for user comfort.

5. The load distributing vest and harness container combination as set forth in claim 1, wherein said vest straps extend under said harness container straps and said lift webs.

6. The load distributing vest and harness container combination as set forth in claim 5, wherein said vest straps are kept in alignment with said lift webs by a guide element.

7. The load distributing vest and harness container combination as set forth in claim 6, wherein said guide element includes a guide panel on each of said lift webs through which a respective vest strap passes.

8. The load distributing vest and harness container combination as set forth in claim 1, wherein said load distributing vest includes an outer layer and an inner layer made of a nylon fabric mounted on a bio-contoured pad made of multi-density foam material.

9. The load distributing vest and harness container combination as set forth in claim 1, wherein said yoke and said vest straps have a layered construction with an inner layer, an outer layer and a bio-contoured pad positioned between said inner and outer layers.

10. The load distributing vest and harness container combination as set forth in claim 9, wherein a total thickness of said layered construction is between about ⅜th inch and about one half inch.

11. A method of retrofitting an existing parachute harness container with a bio-contoured load distributing vest, said vest having a yoke with an outer edge and a neck-facing edge, and two load bearing vest straps with proximal ends integral with or connected to said yoke and extending outwardly from adjacent the neck-facing edge of said yoke to strap distal ends, said container including harness container straps that are worn across the jumper's shoulders to secure the container in position on the jumper's back and lift webs connected to parachute risers to support the jumper during descent, said method comprising the steps of:

attaching the yoke in an area adjacent said yoke outer edge to said parachute harness container with said strap proximal ends extending upwardly from said yoke neck-facing edge;

aligning the vest straps to run generally parallel with said harness container straps so that said vest strap distal ends extend downwardly and the vest straps extend under the harness container straps; and attaching the vest straps to the lift webs on either side of the parachute harness container, each of said vest straps being respectively attached at a vest strap attachment point on said lift webs such that a length of said load distributing vest from said yoke to said vest strap attachment points is less than a distance between a yoke attachment point on the harness container and said vest strap attachment points on said lift webs as measured from the harness container along said harness container straps so that load from said harness container is distributed across the jumper's back, shoulders and chest by the load distributing vest.

12. The method as set forth in claim 11, wherein the step of aligning the vest straps includes retaining the vest straps in alignment with the harness straps using a guide element.

13. The method as set forth in claim 12, wherein said guide element includes a guide panel made to form a channel, the step of retaining the vest straps including running said vest straps through said guide panel channels to retain the vest straps in alignment with said harness straps.

14. A load distributing vest and parachute harness container combination comprising:

a parachute harness container including harness container straps that are worn across the jumper's shoulders to secure the container in position on the jumper's back when the harness container is worn, and lift webs connected to parachute risers to support the jumper during descent, said container configured to secure therein at least a main parachute; and a load distributing vest including an upper yoke and a pair of vest straps extending outwardly from the yoke to respective vest strap ends, said vest being attached to the harness container at a vest attachment point and said vest straps extending generally parallel with said harness container straps and being in contact with the jumper's shoulders, back and chest, each of said vest straps being attached to said lift webs at a respective vest strap attachment point, said vest in relationship with dimensions of said harness container elevating the harness container above the vest straps and spacing a top flap of said harness container away from the jumper's head to increase head range of motion by eliminating interaction between the jumper's head and the top flap.

15. The load distributing vest and parachute harness container combination as set forth in claim 14, wherein a length of said load distributing vest from said yoke to said vest strap attachment points is less than a distance between said vest attachment point on the harness container and said vest strap attachment points on said lift webs as measured from the harness container along said harness container straps so that load from said harness container is distributed across the jumper's back, shoulders and chest by the load distributing vest.

* * * * *